United States Patent [19]

Muckelrath

[11] Patent Number: 5,239,587
[45] Date of Patent: Aug. 24, 1993

[54] SOUND RECORDING DEVICE FOR USE BY HUNTERS

[76] Inventor: Bruce Muckelrath, Rte. 1, Box 284-C2, Sheridan, Ark. 72150

[21] Appl. No.: 835,513

[22] Filed: Feb. 14, 1992

[51] Int. Cl.⁵ .................................. H04R 29/00
[52] U.S. Cl. ................................ 381/56; 360/5; 369/19; 340/309.15; 340/573; 381/122; 381/124
[58] Field of Search ............... 381/56, 122, 124; 340/309.15, 573; 360/5; 369/19

[56] References Cited

U.S. PATENT DOCUMENTS

| | | | |
|---|---|---|---|
| 4,562,590 | 12/1985 | DeLage | 381/90 |
| 4,807,051 | 2/1989 | Ogura | 381/122 |
| 4,819,101 | 4/1989 | Lemelson | 360/10.1 |
| 4,876,721 | 10/1989 | Kerr et al. | 381/56 |
| 4,884,064 | 11/1989 | Meehan | 340/573 |
| 5,146,353 | 9/1992 | Isoguchi et al. | 358/906 |

Primary Examiner—Forester W. Isen
Attorney, Agent, or Firm—Ray F. Cox, Jr.

[57] ABSTRACT

The present invention provides for the unattended recording of game animal sound activities in hunting areas by combining an external microphone and a sound recording apparatus housed within a weather resistent case. The sound recording apparatus includes a high gain amplifier so that sounds over a wide geographic area may be detected. The output of the high gain amplifier is fed into a standard cassette tape recorder. The entire apparatus is provided with a digital clock and means for taking the output of the digital clock and turning the apparatus on and off at selected time intervals in order to take a sample of sound activity over an extended time interval without requiring the hunter to spend an excessively lengthy amount of time in reviewing the recorded sounds.

3 Claims, 3 Drawing Sheets

SOUND RECORDING DEVICE FOR USE BY HUNTERS

BACKGROUND OF THE INVENTION

The present invention relates to devices for amplification and unattended recording of sounds and, in particular, for devices adapted for use by hunters for unattended recording of game animal sound activity in hunting areas.

It is particularly important for hunters to be able to determine particular locations in hunting areas in which game animals tend to frequent. Many varieties of game animals tend to pass through, congregate or linger in particular locations. However, determining the particular locations in which game animals are likely to be found is not a simple task. The hunter who relies on good fortune to stumble across an area in which animals are likely to be found will probably cover large amounts of territory fruitlessly and may, in fact, pass through an area in which animals are likely to be found at a different time of the day without ever realizing the desirability of the location.

Furthermore, hunters are limited to particular seasons of the year in which hunting activity may be conducted. Hunting activity is, therefore constrained both by the large geographic area in which hunting may be successfully accomplished and the limited amount of time in which to determine the most favorable locations.

Accordingly, it would be desirable to be able to determine in advance of a hunting season those specific locations within a larger area in which hunting is most likely to be successfully accomplished. It is known that particular varieties of game animals produce distinctive sounds, both due to vocalizations and to physical movements. Therefore, areas frequented by game animals may be identified in advance of a hunting season by amplifying and recording sound activities over a period of time to determine whether a particular locality has any potential for game animal activity.

While certain prior art has been directed to the problem of enhancing the hearing acuity of a hunter while in the process of hunting, such as U.S. Pat. No. 4,768,613 issued to Brown on Sep. 6, 1988, the present inventor is unaware of any prior art directed to the unattended amplification and recording of game animal sound activities.

SUMMARY OF THE INVENTION

The present invention provides for the unattended recording of game animal sound activities in hunting areas by combining an external microphone and a sound recording apparatus housed within a weather resistant case. The sound recording apparatus includes a high gain amplifier so that sounds over a wide geographic area may be detected. The output of the high gain amplifier is fed into a standard cassette tape recorder. The entire apparatus is provided with a digital clock and means for taking the output of the digital clock and turning the apparatus on and off at selected time intervals in order to take a sample of sound activity over an extended time interval without requiring the hunter to spend an excessivly lengthy amount of time in reviewing the recorded sounds.

It is, therefore, a principal object of the present invention to provide a device for use by hunters for the unattended recording of game animal sound activities in hunting areas.

It is a further object of the present invention to provide for a device that is resistent to weather so that it may be operated out of doors.

It is an additional object of the present invention to provide for a device that is simple and rugged in construction and adapted for ease of use by a hunter.

Additional objects and advantage of the present invention will be clear from the following detailed description of the preferred embodiment in conjunction with the appended drawings.

DETAILED DESCRIPTION OF THE PREFERRED EMBODIMENT

Figure 1:
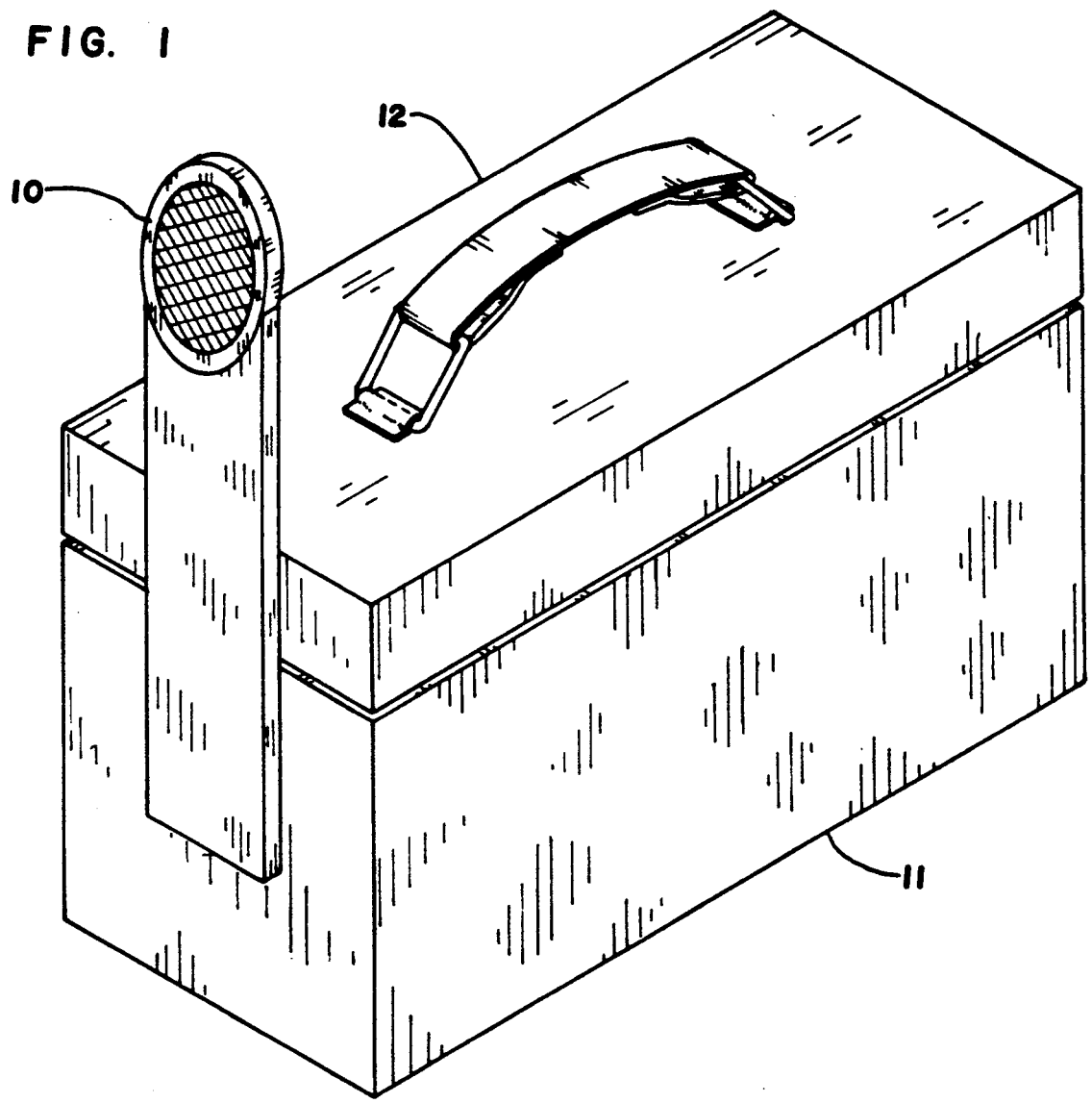
FIG. 1 is a perspective view of the exterior of the invention.
Figure 2:
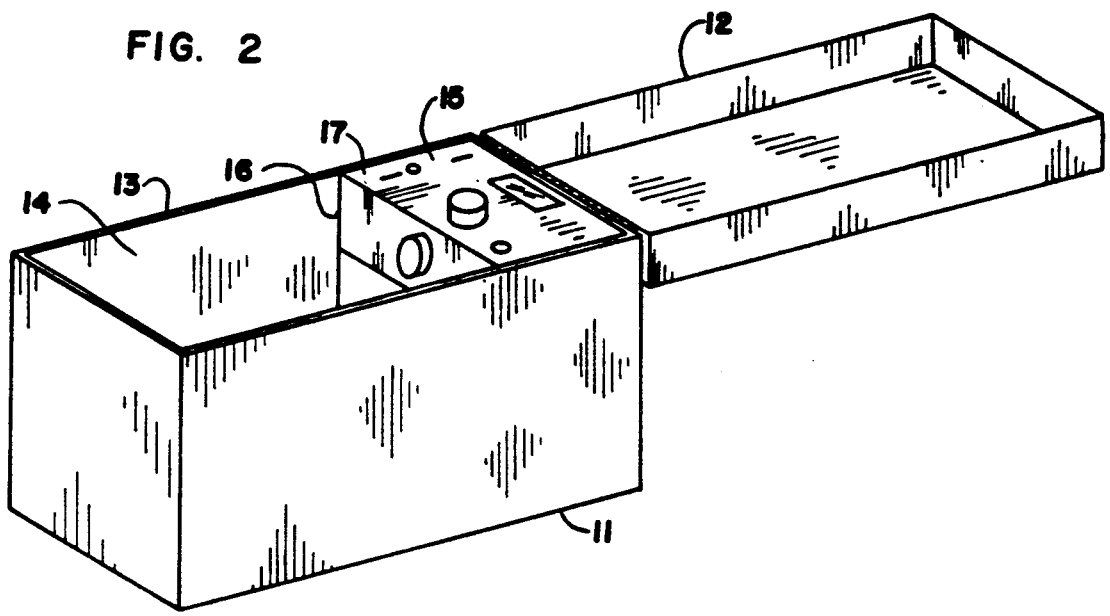
FIG. 2 is a perspective view of the interior of the invention with the external microphone removed for the sake of clarity.

Referring to FIG. 1 which illustrates the external appearance of the invention, an external microphone 10 is mounted to the exterior of a moisture resistent case 11. The case 11 is fitted with a lid 12. Referring to FIG. 2, the case 11 is weather resistent and, in particular, moisture resistent. The case 11 is preferably of a monolithic construction, such as one piece molded plastic or of metal with welded seams. The case 11 is provided with a gasket 13 in the preferred embodiment so that closing the lid 12 results in a moisture resistent barrier between the environment and the interior of the case 11.

The interior of the case 11 is divided into an essentially open portion 14 and an electronics containing portion 15. The open portion 14 is used to receive any of a number of standard consumer quality portable cassette tape recorders.

The electronics containing portion 15 is defined by a vertical control panel 16 and a horizontal control panel 17.

Figure 3:
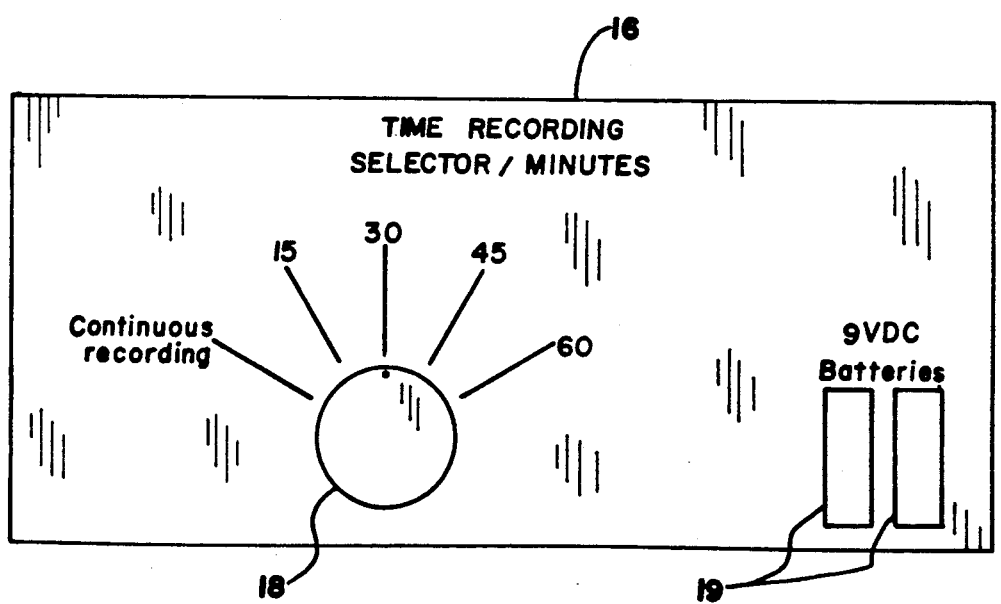
FIG. 3 is a plan view of the vertical portion of the control panel.
Figure 4:
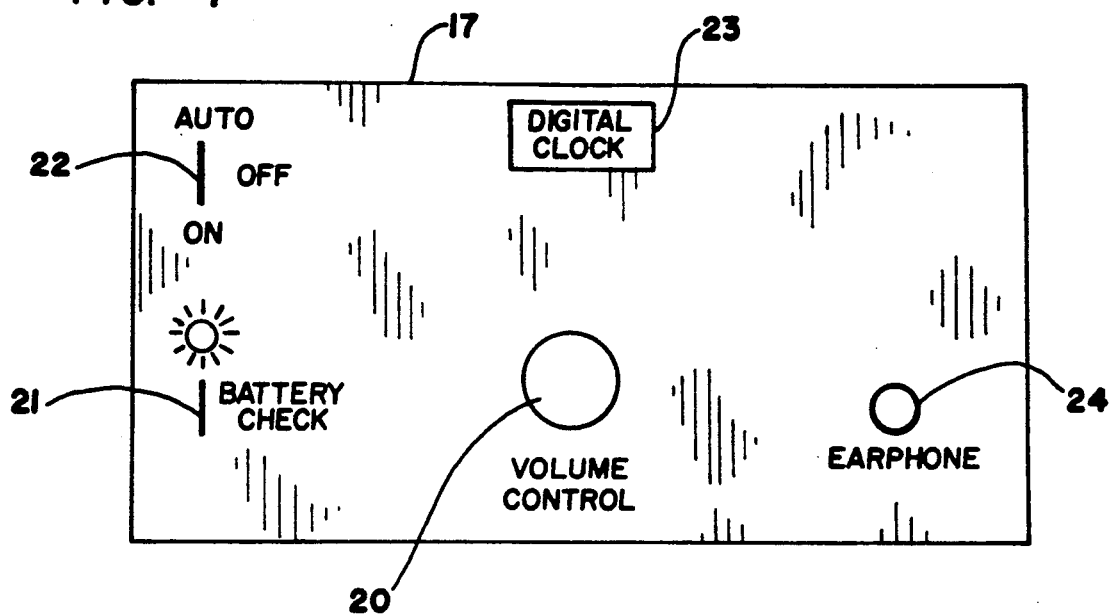
FIG. 4 is a plan view of the horizontal portion of the control panel.

The vertical control panel 16 and the horizontal control panel 17 are shown in greater detail in plan views in FIGS. 3 and 4, respectively. The vertical control panel 16 contains a timing control 18 for a time recording selector 37 for selecting the proportion of time that the recording apparatus is turned on, and a receptacle for holding a pair of 9 volt batteries 19 for powering the sound amplification apparatus. The horizontal control panel 17 provides a volume control 20, battery check switch 21, on-off switch 22, digital clock read out 23 for a digital clock 35 and earphone plug 24.

Figure 5:
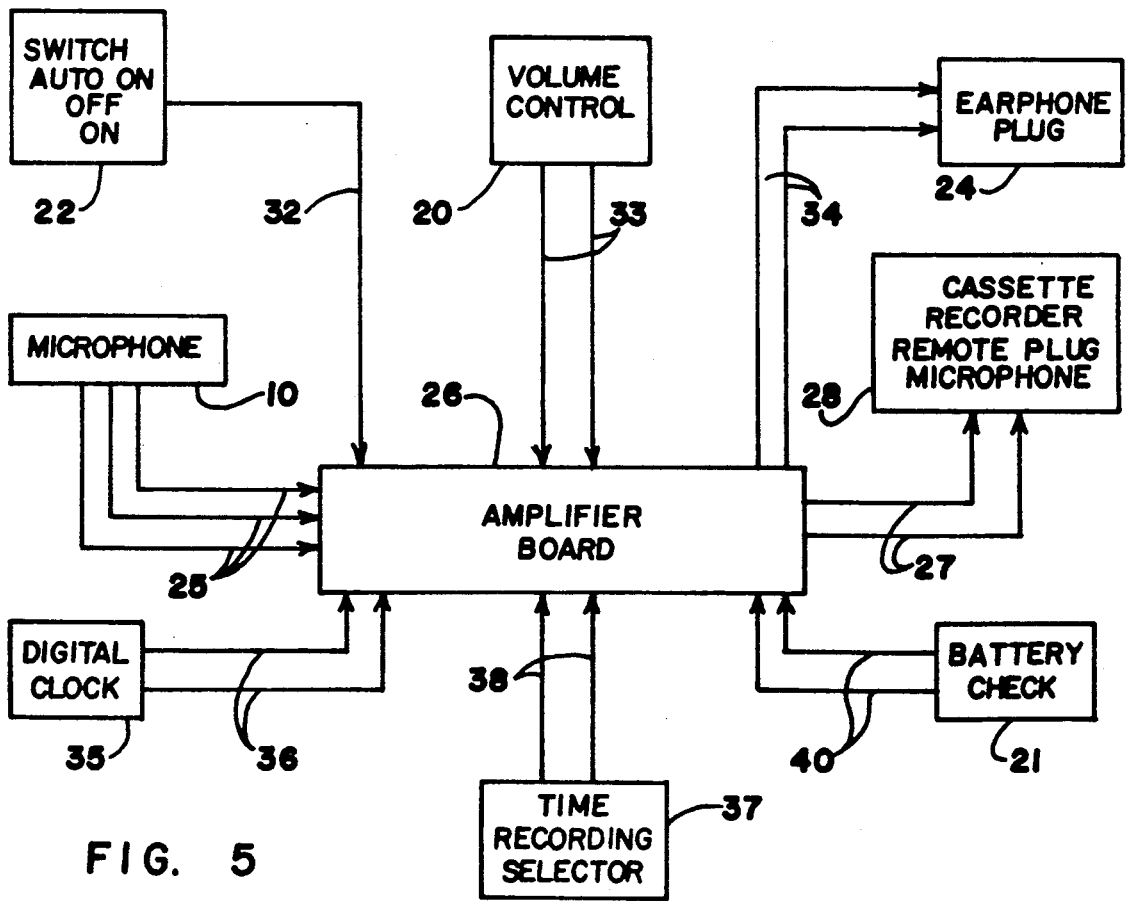
FIG. 5 is a block diagram showing the interrelation of the various components of the invention.

Referring to FIG. 5, the operation of the present invention is described. The external microphone 10 has electrical connections 25 to a high gain amplifier 26. The amplifier 26 must have high gain in order to amplify sounds over a large geographic area. It is desirable, however, that the amplifier 26 provide for automatic gain control so that distant sounds may be amplified but louder sounds in the near vicinity do not overload the amplifier 26. Furthermore, it is desirable that the amplifier 26 have a low current draw so that the device may be operated by a limited number of batteries 19 for an extended period of time. A pair of 9 volt batteries have provided good experience in practice. Electrical connections 27 are provided between the amplifier 26 and a cassette tape recorder 28. The cassette tape recorder 28 may be any one of a number of standard consumer grade cassette tape recorders. The cassette tape recorder 28 is powered by its own internal batteries and thus presents no drain on the batteries 19 whose function is to power the amplifier 26 and related electronics.

The amplifier is provided with an on-off switch 22, volume control 20 and an earphone plug 24. The earphone plug 24 may be used by the hunter for listening to the amplified sound produced by the amplifier 26 when the invention is not being used in the unattended mode. The on-off switch 22, the volume control 20 and the earphone plug 24 are electrically connected to the amplifier 26 through electrical connections 32, 33 and 34 respectively.

A digital clock 35 has electrical connections 36 to the amplifier 26. The digital clock 35 provides time signals for turning the amplifier 26 on and off at selected times as determined by a time recording selector 37. The time recording selector 37 has electrical connections 38 to the amplifier 26. The user through the means of the time recording selector 37 may select varying proportions of on and off time for the amplifier 26 and the cassette tape recorder 28. For example, the user might decide to have the amplifier 26 and the cassette tape recorder 28 turned on for 15 minutes out of each 24 hour period, thus providing a sample of sound activity in the vicinity of the invention. By this means the user avoids the necessity of listening to a lengthy tape recording in order to hear the entire span of time recorded by the invention. A selected sample of time intervals is likely to provide the hunter with a useful selection of sound activity taking place in the vicinity of the invention.

The present invention is also provided with a battery check switch 21 which has electrical connections 40 to the amplifier 26. By the means of the battery check switch 21 the user may determine that the batteries 19 remain active without activating the entire apparatus.

In use the hunter would place a cassette tape recorder in the open portion 14 of the case 11 and connect the output of the amplifier board 26 to the cassette tape recorder 28. The hunter would select the preferred time intervals for the amplifier 26 to operate using the timing control 18 of the time recording selector 37. The case 11 would then be sealed and the device placed in a location where the hunter might suspect game animal activity. After leaving the device unattended for a period of time, the hunter would retrieve the device and listen to the sounds recorded on the cassette tape recorder 28 in order to determine the amount of game animal activity in the vicinity of the device during the period of time the device was left unattended. By placing the device in a number of selected areas during the period of time preceding the opening of the hunting season, the hunter should be able to determine those locations likely to be most advantageous to the hunter.

In an alternative embodiment of the present invention, the external microphone 10 could be made so that sounds originating from a particular distant direction would be preferentially enhanced. This feature might be of value if the hunter wished to avoid amplifying sounds originating in an particular direction or, alternatively, wished to amplify sounds selectively from a particular direction.

The foregoing description of the preferred embodiment is not intended to limit the scope of the present invention as set forth in the following claims.

What is claimed is:

1. A device for use by hunters for unattended recording of game animal sound activity in hunting areas, comprising:
   a moisture resistent case having an interior space;
   means for access to said interior space;
   an external microphone communicating electrically with said interior space;
   sound recording means located within said interior space comprising a high gain amplifier, means for transmitting electrical signals from said external microphone to said high gain amplifier, a cassette tape recorder, means for transmitting electrical signals from said high gain amplifier to said cassette tape recorder, a digital clock, and means communicating with said high gain amplifier, said cassette tape recorder and said digital clock for activating said cassette tape recorder at selected time intervals;
   a plurality of electrical storage batteries; and
   means for electrically connecting said storage batteries to said external microphone and said sound recording means.

2. A device as set forth in claim 1 wherein said external microphone further comprises means for directionally preferential sound detection.

3. A device as set forth in claim 2 wherein said high gain amplifier further comprises means for automatic gain control.

* * * * *